(12) United States Patent
Panandiker et al.

(10) Patent No.: US 6,248,843 B1
(45) Date of Patent: Jun. 19, 2001

(54) POWDER COATINGS BASED ON BRANCHED OLIGOESTERS AND TRIAZOLE BLOCKED POLYISOCYANATES

(75) Inventors: Kamlesh Pai Panandiker, Excelsior, MN (US); John Michael Bronk, Woodstock; James Duncan Pont, Lake in the Hills, both of IL (US)

(73) Assignee: McWhorter Technologies, Inc., Carpentersville, IL (US)

( * ) Notice: Subject to any disclaimer, the term of this patent is extended or adjusted under 35 U.S.C. 154(b) by 0 days.

(21) Appl. No.: 09/156,050

(22) Filed: Sep. 18, 1998

(51) Int. Cl.$^7$ .................................................. C09D 175/06
(52) U.S. Cl. ......................... 525/440; 525/934; 528/45; 528/80; 528/81; 528/296
(58) Field of Search ................................ 525/440, 934; 528/45, 81, 80, 296

(56) References Cited

U.S. PATENT DOCUMENTS

| | | |
|---|---|---|
| 3,721,645 | 3/1973 | Zemlin . |
| 3,857,818 | 12/1974 | Frizelle . |
| 4,197,353 | 4/1980 | Tobias et al. . |
| 4,375,539 | 3/1983 | McBride et al. . |
| 4,413,079 | 11/1983 | Disteldorf et al. . |
| 4,442,270 * | 4/1984 | Passmore ............................. 525/440 |
| 4,482,721 | 11/1984 | Wegner et al. . |
| 5,243,013 | 9/1993 | Hurnik et al. ........................ 528/80 |
| 5,523,377 | 6/1996 | König et al. . |
| 5,587,428 | 12/1996 | Jones et al. ......................... 525/165 |
| 5,610,263 | 3/1997 | Jones et al. ......................... 528/272 |
| 5,621,064 | 4/1997 | Laas et al. . |
| 5,641,854 | 6/1997 | Jones et al. ......................... 528/128 |
| 5,910,563 | 6/1999 | Jones et al. ......................... 528/272 |
| 5,955,550 | 9/1999 | Jones et al. ......................... 525/440 |

OTHER PUBLICATIONS

Sohoni et al., "Developments in Low Temperature Cure: Urethane Power Curing Agents," presented at the International Waterborne High–Solids, and Powder Coatings Symposium, New Orleans, LA, Feb. 18–20, 1998.

\* cited by examiner

Primary Examiner—Patricia A. Short
(74) Attorney, Agent, or Firm—Fitch, Even, Tabin & Flannery

(57) ABSTRACT

The present invention relates to powder coating compositions which can be cured at low temperatures. The powder coating compositions of the invention include a unique combination of a branched oligoester polyol and triazole blocked isocyanate cross-linking agent which when cured results in a coating binder with desirable hardness, flexibility, solvent resistance, corrosion resistance, weatherability and gloss.

51 Claims, No Drawings

POWDER COATINGS BASED ON BRANCHED OLIGOESTERS AND TRIAZOLE BLOCKED POLYISOCYANATES

The present invention relates to powdered coating compositions which can be cured at low temperatures with or without the use of a catalyst. More particularly, the present invention relates to branched hydroxyl terminated oligoesters which when cross-linked provide improved performance properties at low curing temperatures even without catalyst.

BACKGROUND OF THE INVENTION

Thermosetting powder coating compositions are well known in the art and are widely used as coatings for electric appliances, bicycles, garden furniture, accessories for the automotive industry, general metal parts and the like. Thermosetting powders consist of a mixture of a primary resin and one or more cross-linkers, often called hardeners or curing agents. The general approach associated with powder coating technology is to formulate a coating from solid components, mix them, disperse pigments (and other insoluble components) in a matrix of the major binder components, and pulverize the formulation into a powder. In so far as possible, each particle contains all of the ingredients in the formulation. The powder is applied to the substrate, usually but not limited to a metal, and fused to a continuous film by baking.

A problem with powder coating compositions is that they frequently have low glass transition temperatures ($T_g$) which will lead to agglomeration or sintering of the powdered coating particles when they are stored at elevated temperatures for a prolonged duration of time. The agglomerated powder coating can cause problems during application and may require re-milling, which itself can cause further problems by, for example, adversely affecting the particle size distribution of the re-milled powder coating. Often, powder coating compositions which are formulated to avoid problems with agglomeration and sintering do not provide optimal coatings properties.

It is an object of the invention to provide a powder coating composition which has a relatively high glass transition temperature, will resist agglomeration during storage and which composition will cure without a catalyst at a relatively low temperature.

It is an object of the invention to provide a powdered coating composition which will maximize film properties such as hardness, flexibility, solvent resistance, corrosion resistance, weatherability and gloss, yet also provide a coating composition with a relatively high glass transition temperature and which will cure without a catalyst at relatively low temperatures.

It is another object of the invention to provide a powdered coating composition which can be cured at temperatures as low as about 150° C. without the use of an effective amount of catalyst.

It is another object of the invention to provide a powder coating composition with a desirable melt viscosity.

Other objects, advantages, features and characteristics of the present invention will become more apparent upon consideration of the following description and the appended claims.

SUMMARY OF THE INVENTION

The present invention provides a powder coating composition that will not readily agglomerate during storage and can be cured at temperatures as low as about 140° C. with the use of a urethane catalyst and at 145° C. to about 155° C. without the use of a catalyst.

The powder coating composition of the invention comprises a unique combination of a branched oligoester polyol and cross-linking agent which when cured results in a coating with desirable hardness, flexibility, solvent resistance, corrosion resistance, weatherability and gloss. The branched oligoester polyol has a unique combination of branched structure, number average molecular weight, hydroxyl number, and acid number which provides a relatively high glass transition temperature, and hence, agglomeration resistance. When the latter branched oligoester polyol is cured with a triazole blocked isocyanate, the combination of branched oligomer and isocyanate provides a coating binder with good performance characteristics even without catalysts. The invention provides a reactivity and high rate of cure at lower temperatures without sacrificing storage stability to agglomeration or sintering.

The branched oligoester polyol has a Tg of at least about 40° C. to about 80° C., a number average molecular weight of from about 1000 to about 7500 daltons, a hydroxyl functionality of about 1.5 to about 5.0, a hydroxyl number of from about 15 to about 250 and an acid number of about 1 to about 25, and in an very important aspect, an acid number of about 5 to about 7. In another important aspect, the branched oligoester will have a viscosity of from about 20 to about 90 poise at about 200° C.

The powder coating composition of the invention comprises the branched oligoester polyol and triazole blocked isocyanate powder coating crosslinking agent each in relative amounts which are effective for providing crosslinked coating compositions with a pencil hardness of at least about H, a direct impact resistance of at least about 80 in lb and a reverse impact resistance of at least about 80 in lb at a binder thickness of about 0.8 to about 2.5 mils when curing is conducted on ground steel panels of a thickness of 0.032 inches at temperatures as low as from about 140° C., preferably about 145° C. to about 155° C. The powder coating composition of the invention which comprises the branched oligoester polyol and triazole blocked isocyanate has a Tg of from about 40° C. to about 70° C. In an important aspect the powder coating composition comprises from about 18 to about 97 weight percent of the branched hydroxyl terminated oligoester, based on the weight of branched oligoester polyol and crosslinking agent.

The branched oligoester polyol may be synthesized by forming a generally linear hydroxyl terminated oligoester diol by reacting a diol and a diacid and then reacting the resulting hydroxyl terminated oligoester diol with less than a stoichiometric amount (relative to the hydroxyls on the oligoester) of a polyacid having a carboxyl functionality of at least about 3. This less than stoichiometric amount provides some carboxyl groups to the oligomer, but its more important purpose is to generally provide complex branching of the oligoester polyol so that oligomer chains extend in some cases, from all of the carboxyl functionality of the polyacid and some of the polyacids are interconnected by oligomer chains. In an important aspect, the carboxyl functionality from the polyacid reacted with the oligoester is not more than about 15% of the equivalents of the stoichiometric amount of carboxyl equivalent needed to react with all of the hydroxyl groups of the oligoester. In an important aspect, the ratio of hydroxyl terminated oligoester diol to triacid is from about 9.0:1 to about 30:1, preferably about 10:1 to about 20:1.

In an important aspect of the invention, the hydroxyl terminated diol is the reaction product of an aliphatic diol (open chain or cycloaliphatic) and an aromatic diacid, diacid halide, or diacid anhydride, such as terephthalic acid, which provides a hydroxyl terminated oligoester diol having aromatic groups. Alternatively in this aspect, the acid may be a straight chain or cycloaliphatic diacid, diacid anhydride or diacid halide, and the diol may be hydroquinone to provide the oligoester with aromatic monomers along its main chain.

In another important aspect, the diol used for the oligoester diol is a straight chain aliphatic or cycloaliphatic diol and the diacid is a cycloaliphatic diacid, diacid anhydride, or diacid halide, which monomers provide an oligoester diol having cycloaliphatic groups.

In yet another aspect, if the diacid, diacid anhydride or halide and diol used to make the oligoester diol are both straight chain, an aromatic monomer having hydroxyl and carboxyl functionality may be used to improve properties of the ultimate coating composition. These aromatic monomers having hydroxy and carboxy functionality include ortho, meta, and parahydroxybenzoic acid. While not intending to be bound by any theory, it appears that the ring and straight chain combination, or aromatic cycloaliphatic combination provides desired film properties.

The hydroxyl terminated oligoester diol is the reaction product of excess diol with a diacid. The diol may be one or more diols selected from the group consisting of neopentyl glycol, 1,6 hexane diol, 2-butyl-2-ethyl-1,3-propane diol, 1,4 cyclohexanedimethanol, diethylene glycol, 1,3 propanediol, hydrogenated bisphenol A, 2,3,4,4-tetramethyl-1,3-cyclobutanediol, ethylene glycol, propylene glycol, 2,4-dimethyl-2-ethylhexane-1,3-diol, 2-ethyl-2-isobutyl-1,3-propanediol, 1,3-butanediol, 1,4-butanediol, 1,5-pentanediol, thiodiethanol, 1,2-cyclohexanedimethanol, 1,3-cyclohexanedimethanol, 1,4-xylylenediol, ethoxylated bisphenol A, ester diol 204 (Union Carbide), 3-hydroxy-2, 2-dimethylproprionate, unoxol 6 diol, methyl propanediol, 2-methyl-1,3-propane diol, hydroxypivalyl hydroxypivalate (HPHP), vinyl cyclohexanediol, dipropylene glycol, ester diols, dimethylol proprionic acid (DMPA), and mixtures thereof.

The aromatic acids/anhydrides/acid halides used in the invention are selected from the group consisting of terephthalic acid, phthalic acid, phthalic anhydride, dimethyl terephthalic acid, naphthalene dicarboxylate, tetrachlorophthalic acid, terephthalic acid bisglycol ester, isophthalic acid, t-butyl isophthalic acid, and mixtures thereof.

Aliphatic acids/anhydrides/acid halides useful in the present invention are selected from the group consisting of fumaric acid, adipic acid, azelaic acid, sebacic acid, dodecanoic acid, glutaric acid, succinic acid, oxalic acid, itaconic acid, dimer fatty acids, maleic anhydride, succinic anhydride, chlorendic acid, diglycolic acid, nadic acid, and mixtures thereof.

Cycloaliphatic acids/anhydrides/acid halides used in the invention may include acids/anhydrides such as 1,4-cyclohexane diacid, 1,3-cyclohexane dicarboxylic acid, hexahydrophthalic anhydride, dimethyl cyclohexane dicarboxylate, and mixtures thereof. Mixtures of these compounds may also be used for the preparation of the ester diols.

Aromatic diols or dihydroxy phenolic compounds which may be used to make the oligoester diol include hydroquinone, catechol, resorcinol, p,p'-dihydroxy diphenyl methane, bisphenol A, p,p'-dihydroxy diphenyl ketone, p,p'-dihydroxydiphenyl, and mixtures thereof. Typically when such phenolic type dihydroxy compounds are used to make the oligoester diols, base catalyst is typically required.

The reaction which forms the hydroxyl terminated oligoester diol is conducted for a time and temperature effective to provide an oligoester diol having a number average molecular weight in the range of from about 400 to about 1500 daltons and then the reaction is slowed by cooling to about 170° C. to about 200° C. to provide the latter oligoester diol. Generally, the reaction which provides the oligoester diol is conducted at a temperature of about 240° C. for about 4 to about 15 hours before the reaction is cooled.

This relatively low molecular weight hydroxyl terminated oligoester diol is reacted with the polyacid/anhydride/polyols or mixtures thereof selected from citric acid, pyromellitic anhydride, trimellitic anhydride, trimethylolpropane, trimethyolethane, pentaerythritol, and ditrimethyolpropane. In an important aspect of the invention, the polyacid or triacid which is reacted with the hydroxyl terminated oligoester diol is an aromatic acid. The branching reaction is conducted for a time and temperature effective for providing the branched oligoester polyol described herein. The reaction which forms the branched oligoester polyol is conducted at a temperature of about 180° C. to about 240° C. for about 4 to about 15 hours.

Triazole blocked isocyanate, which is a reaction product of a substituted or unsubstituted triazole with an isocyanate compound, is an important cross-linking agent in the present invention. The amount of cross-linking agent in the composition is effective for providing an equivalent ratio of isocyanate groups to hydroxyl groups of from about 0.5:1.0 to about 1.8:1.0.

In an important aspect of the invention, the triazole blocked isocyanate is isophorone diisocyanate prepolymer blocked with triazole or equally a blend of isophorone diisocyanate trimer, isophorone diisocyanate monomer and other isophorone diisocyanate homologues, all blocked with triazole. In the aspect of the invention using prepolymer, the prepolymer is the reaction product of isophorone diisocyanate and trimethylolpropane. The prepolymer is blocked with a triazole blocking agent to provide a prepolymer having less than 1% free isocyanate. In an important aspect, when triazole blocked isocyanate is used as the cross-linking agent in the composition, the composition contains from about 3 to about 82 weight percent triazole blocked isocyanate powder coating cross-linking agent, based on the weight of branched hydroxyl terminated oligoester and cross-linking agent.

In another important aspect, the present invention further provides a process for the preparation of powder coating compositions wherein the branched hydroxyl terminated oligoester prepared as described herein, is blended with a triazole blocked isocyanate powder coating cross-linking agent, and optionally with auxiliary substances conventionally used in the manufacture of powder coatings.

DETAILED DESCRIPTION OF THE INVENTION

Definitions

As used herein "coating binder" is the polymer portion of a coating film after baking and after cross-linking.

"Polymeric vehicle" means all polymeric and resinous components in the formulated coating; i.e. before film formation. Pigments and additives may be mixed with the polymeric vehicle to provide a formulated powder coating composition.

"Diol" is a compound with two hydroxyl groups. "Polyol" is a compound with two or more hydroxyl groups.

"Diacid" is a compound with two carboxyl groups. "Polyacid" is a compound with two or more carboxyl groups and may be an acid or acid anhydride.

A "film" is formed by application of the powder coating composition to a base or substrate, and then cross-linking the powder coating composition.

"Sintering" means the loss of particulate characteristics of the powder during storage resulting in lumps and agglomeration or, in extreme cases, a solid mass. Amounts of material are used in the composition of the present invention which are effective for providing a powdered coating that is substantially nonsintered.

"Substantially non sintered" means that after exposing a powder coating to a given set of conditions that are hotter than normally recommended for powder coating storage, and then cooling to room temperature, the powder coating retains its particulate characteristics with only a few lumps which can be readily broken up with moderate pressure.

"Polyester" means a polymer which has

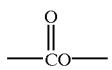

Linkage in the main chain of the polymer. "Oligomer" means a compound that generally has repeating monomeric units and is similar to a polymer, but has a number average weight not greater than about 7500 daltons with or without repeating monomeric units. A "polymer" will have a number average molecular weight of over about 7500 daltons.

"Acid number" or "acid value" means the number of milligrams of potassium hydroxide required for neutralization of the free acids present in 1 g of resin.

"Hydroxyl number" or "hydroxyl value" which is also called "acetyl value" is a number which indicates the extent to which a substance may be acetylated; it is the number of milligrams of potassium hydroxide required for neutralization of the acetic acid liberated on saponifying 1 g of acetylated sample.

"Catalyst" means a material that, under a given set of conditions, speeds up a chemical reaction. Generally, less than about 0.02 weight percent urethane catalyst, based on the weight of the powder coating composition, is not effective for urethane catalysis and does not increase reaction rates.

Branched, Hydroxyl Terminated Oligoester Resin

Both the Tg and melt viscosity of the resin are greatly influenced by the choice of monomers. In an important aspect of the invention, the branched hydroxyl terminated oligoester resin is made by a two stage process. In stage one, a hydroxyl terminated oligoester diol is prepared, and in stage two a branched hydroxyl terminated oligoester polyol is formed.

Stage One: In stage one, a hydroxyl terminated oligoester diol is formed through the esterification or condensation reaction of a stoichiometric molar excess of a diol (relative to the carboxyls on the acid) with a dicarboxylic acid, dicarboxylic acid anhydride or dicarboxylic acid halide such as an acid chloride.

(1) Diols which may be used in the reaction may be selected from the group consisting of neopentyl glycol, 1,6 hexane diol, 2-butyl-2-ethyl-1,3-propane diol, 1,4 cyclohexanedimethanol, diethylene glycol, 1,3 propanediol, hydrogenated bisphenol A, 2,3,4,4-tetramethyl-1,3-cyclobutanediol, ethylene glycol, propylene glycol, 2,4-dimethyl-2-ethylhexane-1,3-diol, 2-ethyl-2-isobutyl-1,3-propanediol, 1,3-butanediol, 1,4-butanediol, 1,5-pentanediol, thiodiethanol, 1,2-cyclohexanedimethanol, 1,3-cyclohexanedimethanol, 1,4-xylylenediol, ethoxylated bisphenol A, ester diol 204 (Union Carbide), 3-hydroxy-2, 2-dimethylproprionate, unoxol 6 diol, methyl propanediol, 2-methyl-1,3-propane diol, hydroxypivalyl hydroxypivalate (HPHP), vinyl cyclohexanediol, dipropylene glycol, ester diols, dimethylol proprionic acid (DMPA), and mixtures thereof.

Aromatic diols such as hydroquinone, catechol, resorcinol, p,p'-dihydroxy diphenyl methane, bisphenol A, p,p'-dihydroxy diphenyl ketone, p,p'-dihydroxydiphenyl, and mixtures thereof, also may be reacted with straight chain or cycloaliphatic diacids.

(2) Aromatic diacids, aliphatic diacids and/or cycloaliphatic diacids or anhydrides or acid halides may be used to make the hydroxyl terminated diols.

In an important aspect, the aromatic acid/anhydride/acid halide is selected from the group consisting of terephthalic acid, phthalic acid, phthalic anhydride, dimethyl terephthalic acid, naphthalene dicarboxylate, tetrachlorophthalic acid, terephthalic acid bisglycol ester, isophthalic acid, t-butyl isophthalic acid, and mixtures thereof, or acid halides thereof.

Aliphatic acid/anhydrides/aicd halides which may be used in the invention include fumaric acid, adipic acid, azelaic acid, sebacic acid, dodecanoic acid, glutaric acid, succinic acid, oxalic acid, itaconic acid, dimer fatty acids, maleic anhydride, succinic anhydride, chlorendic acid, diglycolic acid, nadic acid, and mixtures thereof.

Cycloaliphatic acid/anhydrides/acid halides which may be used in the invention include acids/anhydrides such as 1,4-cyclohexane diacid, 1,3-cyclohexane dicarboxylic acid, hexahydrophthalic anhydride, dimethyl cyclohexane dicarboxylate, and mixtures thereof.

Mixtures of these compounds may also be used for the preparation of the ester diols as mixed functional intermediates. Ester diols are those prepared in a known manner from lactones and dihydric alcohols as starter molecules through a ring opening reaction. The preparation of ester diols may include lactones such as β-propiolactone, γ-butyrolactone, γ- and delta-valerolactone, ε-caprolactone, 3,5,5,- and 3,3,5-trimethylcaprolactone or mixtures thereof. Suitable starter molecules include the described dihydric alcohols listed.

In a very important aspect of the invention, the aromatic acid is one or more aromatic acids selected from the group consisting of terephthalic acid (TPA), isophthalic acid (IPA), and t-butyl isophthalic acid. These are reacted with an aliphatic or cycloaliphatic diol such as neopentyl glycol, 1,6 hexane diol, 2-butyl-2-ethyl, 1,3-propanediol, and 1,4-cyclohexane dimethanol.

The diol component and diacid component are each present in amounts effective for providing the coating composition and subsequent coating with the properties described. In an important aspect of the invention, the combination of neopentyl glycol and 1,6 hexane diol in a molar ratio of about 4.0:1 to about 7.0:1, preferably about 5.6:1, is reacted with TPA, IPA or t-butyl isophthalic acid provides a coating composition with an acceptable Tg.

The reaction to obtain hydroxyl terminated oligoester diol may be conducted at about 240° C. for about 4 to about 15 hours and then is cooled to obtain the generally linear product having the Mn of from about 400 to about 1500 daltons. If an aliphatic acid is reacted with an aromatic dihydroxyl compound such as hydroquinone, catechol, resorcinol, p,p'-dihydroxy diphenyl methane, bisphenol A, p,p'-dihydroxy diphenyl ketone, p,p'-dihydroxydiphenyl, and mixtures thereof, the use of base catalysts typically are required.

Stage Two: In stage two, the hydroxyl terminated oligoester diol prepared in stage one is reacted to form a branched hydroxyl terminated oligoester polyol. In an important aspect of the invention, the hydroxyl terminated oligoester prepared in stage one is reacted with a polyacid/anhydrides or blend of polyacids/anhydrides which are at least a triacid. The triacid, or triacid blend is selected from the group consisting of trimellitic anhydride (TMA) and citric acid. In a very important aspect, the triacid is an aromatic acid such as trimellitic anhydride.

In an important aspect of the invention, the resulting branched hydroxyl terminated oligoester has a hydroxyl functionality of about 1.5 to about 5.0, a hydroxyl number of from about 15 to about 250, an acid value of about 1 to about 25, and a number average molecular weight in the range of from about 1000 to about 7500 daltons. The branched hydroxyl terminated oligoester has a Tg of at least about 40° C., and in an important aspect from about 40° C. to about 80° C. In a very important aspect, the ratio of hydroxyl terminated oligoester to polyacid is about 9.0:1 to about 30:1.

Cross-linking Agents

Triazole Blocked Isocyanate Cross-linkers: In an important aspect of the invention, the cross-linking agent is a triazole blocked polyisocyanate compound which is the reaction product of a substituted or unsubstituted triazole with an isocyanate compound. Known polyisocyanates may be used as isocyanate compounds as starting materials for producing the blocked polyisocyanates according to the present invention. These known polyisocyanates generally contain from about 2 to about 4 isocyanate groups and have a molecular weight of from about 100 to about 10,000 preferably about 150 to about 3000. Polyisocyanates suitable for use in the present invention include simple polyisocyanates, such as hexamethylene diisocyanate, 2,4-diisocyanato toluene, 2,6-diisocyanato toluene, 1-isocyanato-3,3,5-trimethyl-5-isocyanatomethyl cyclohexane, 4,4-diisocyanatodiphenyl methane, 2,4'-diisocyanatodiphenyl methane, or derivatives of these diisocyanates containing biuret or urethane groups.

Isocyanate compounds which can be reacted with a triazole blocking group also include derivatives containing biuret groups include polyisocyanates of the type described in U.S. Pat. No. 3,124,605, i.e. mixtures of homologues consisting of tris-(isocyanatohexyl) biuret and higher homologues of this polyisocyanate, of the type obtained in the biuretization of hexamethylene diisocyanate. These biuret polyisocyanates also have an average NCO-functionality of from 2 to 4 and an average molecular weight below 10,000, preferably about 150 to about 3000.

Suitable urethane derivatives or "prepolymers" of the diisocyanates exemplified above may be used as isocyanate compounds which are reacted with the triazole. These urethane derivatives or prepolymers may include the above polyisocyanates as reaction products with less than equivalent quantities of aliphatic diols or triols having molecular weights of from about 62 to about 200, such as ethylene glycol, 1,2- or 1,3-propane diol, 1,2-butane diol, tetramethylene or hexamethylene glycol, diethylene glycol, trimethylol propane, trimethylol ethane or glycerol. In the production of these urethane-modified derivatives of the above-mentioned diisocyanates, the diisocyanates are reacted with the exemplified polyhydric alcohols in ratios which correspond to an NCO/OH-equivalent ratio of at least about 2:1, preferably from about 2:1 to about 20:1. The urethane-modified polyisocyanates obtainable in this way also have NCO-functionalities of from about 2 to about 4, preferably from about 2 to about 3, and (average) molecular weights below about 10,000, preferably about 150 to about 3000.

In an important aspect, blocked polyisocyanate compounds in accordance with the present invention may be represented by the general formulas

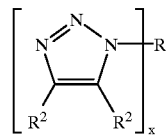

and

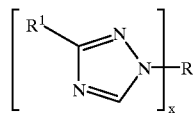

where R is an isocyanate compound as described above, $R^1$ is H or thiol, $R^2$ is H or pyridine, and x is 2 to 4. In this aspect of the invention, each isocyanate group on the isocyanate may be blocked with a trizaole. In a very important aspect of the invention, the triazole blocking agent may include 1H-1,2,4-triazole, 1H-1,2,3-triazole, 1H-1,2,4-triazole-3-thiol and 1H-1,2,3-triazolo[4,5-b]pyridine.

The reaction of the starting polyisocyanate compounds with the blocking agent may be carried out in the presence of aprotic solvents which are inert to isocyanate groups, or in the melt. Suitable solvents are, for example, ethyl acetate, butyl acetate, acetone, methylethyl ketone, methylisobutyl ketone, tetrahydrofuran or dioxane. The blocking reaction is generally carried out at temperatures of from about 40° to about 160° C., preferably from about 60° to about 130° C. At reaction temperatures above about 60° C., the reaction may be carried out in the absence of catalysts and, in most cases, is over after only from 30 to 60 minutes. The blocking agent is preferably used in an at least equivalent quantity. In many cases, it is advisable to use a slight excess in order to obtain a more complete blocking of the free isocyanate groups. The free NCO content is typically less than about 1%.

In cases where the exemplified urethane-modified polyisocyanates are used as starting material, the production and blocking thereof maybe carried out in a single-stage or multi-stage reaction or in continuous process such as described in U.S. Pat. No. 4,997,900 in which the non-urethane-modified diisocyanate is reacted with blocking agent and one or more of the exemplified polyols.

Preparation and Application of the Thermosetting Powder

For the preparation of the thermosetting powder compositions, the branched hydroxyl terminated oligoester resin, the cross-linking agent and various auxiliary substances conventionally used for the manufacture of powder coatings are mixed homogeneously. This homogenization is carried out for example by melting the oligoester, the cross-linking agent and the various auxiliary substances at a temperature within the range of from about 50° to about 150° C., preferably in an extruder, for example a Buss-Ko-Kneader extruder or a twin-screw extruder of the Werner-Pfleiderer or Baker Perkins type. The extrudate is then allowed to cool, is ground and sieved to obtain a powder suitable for electrostatic or fluidized bed application.

Another factor affecting viscosity and flow is the level of pigmentation and fillers in the system. High levels of pigmentation and/or fillers detract from the flow of the system by increasing the melt viscosity. Fine particle size organic pigments such as carbon black, phthalocyanine blue and quinacridones also cause a significant increase in melt viscosity even at low levels.

The auxiliary substances which can be added to the thermosetting compositions according to the invention include ultraviolet light absorbing compounds such as Tinuvin 900 (from CIBA-GEIGY Corp.), light stabilizers based on sterically hindered amines (for example Tinuvin 144 from CIBA-GEIGY Corp.), phenolic antioxidants (for example Irganox 1010 and Irgafos 168 from CIBA-GEIGY Corp.) and stabilizers of the phosphonite or phosphite type. A variety of pigments may also be added to the thermosetting compositions according to the invention. Examples of pigments that may be employed in the invention are metal oxides such as titanium dioxide, iron oxide, zinc oxide and the like, metal hydroxides, metal powders, sulfides, sulfates, carbonates, carbon black, iron blues, organic reds, organic yellows, organic maroons and the like. Examples of fillers that may be employed are aluminum silicate, talc, barytes, blanc fixed, calcium carbonate and magnesium carbonate. Auxiliary substances may also include flow control agents such as Resiflow PV5 (from WORLEE), Modaflow 3 and 2000 (from MONSANTO), Acronal 4F (from BASF), Resiflow P-67 (from Estron), plasticizers such as dicyclohexyl phthalate, triphenyl phosphate, grinding aids, degassing agents such as benzoin, and catalysts such as stannous octoate, dibutyltindilaurate and the acetylacetonates of zinc, manganese, iron, aluminum and magnesium. These auxiliary substances are added in conventional amounts, it being understood that if the thermosetting compositions of the inventions are used as clear coatings, opacifying auxiliary substances should be omitted.

In addition, urethane catalysts can also be mixed with the thermosetting compostion of the invention. Catalysts useful in the present invention include 1,5-diazabicyclo(4.3.0)non-5-ene, 1,8-diazabicyclo(5.4.0)undec-7-ene, dibutyltin dilaurate, butane stannoic acid, dibutyltin oxide, stannous octoate, and others know in the art.

The powder coating compositions which are the subject matter of the present invention are suitable to be applied on articles to be coated by, but not limited to conventional techniques, e.g. by application by means of an electrostatic or tribostatic spray gun or by fluidized bed techniques, or by powder cloud technology (Material Sciences Corporation).

After having been applied to the article in question, the deposited coatings are cured by heating in an oven. In an important aspect, curing is effected at a temperature of as low as about 145° C. for about 45 minutes or 155° C. for about 30 minutes in order to obtain sufficient cross-linking with uncatalyzed compositions to provide the described coating properties. Alternatively, desirable coating properties can be obtained by curing at a temperature of about 190° C. for about 7 minutes, heating at about 205° C. for about 5 minutes, and for coil coating end uses by heating at about 400° C. for about 20 seconds. Curing by infrared (IR) is also applicable.

The following examples illustrate methods for carrying out the invention and should be understood to be illustrative of, but not limiting upon, the scope of the invention which is defined in the appended claims.

EXAMPLES EXAMPLE 1

Stage 1
Preparation of hydroxyl terminated oligomer

| Reactant | Weight |
|---|---|
| Neopentyl Glycol (Eastman) | 805 gms |
| 1,6 hexanediol (UBE) | 161 gms |
| Terephthalic acid (Amoco) | 1145 gms |
| Butylchlorotin dihydroxide (Elf-Atochem) | 2.1 gms |
| Antioxidant (Weston 618-General Electric) | 4.6 gms |

The mixture was heated gradually to 205° C. and then processed at 240° C. to an acid value of 4 to 7 mg KOH/gram resin with an ICI cone and plate viscosity of 10–14 poise at 125° C. The hydroxyl number of this oligomer was found to be about 130–140 mg KOH/gram resin.

Stage 2
Preparation of Hydroxyl Terminated Branched Oligoester

The above oligomer was cooled to 180° C. and 153.5 gms of trimellitic anhydride were added. The temperature was raised to 210–215° C. and vacuum was slowly applied over a 50 minute period until a vacuum of 23–24 inches of mercury was obtained. The reaction was monitored by regularly taking a sample and determining the acid number and ICI cone and plate viscosity @ 200° C. When an ICI cone and plate viscosity of 50–60 poise and an acid value of 4–10 mg KOH/gram resin were obtained, the melt was cooled down to 195° C. and discharged from the flask. The color of the resin was nearly colorless/transparent to light yellow in color.

EXAMPLE 2

Stage 1
Preparation of hydroxyl terminated oligomer

| Reactant | Weight |
|---|---|
| Neopentyl Glycol (Eastman) | 1396.99 gms |
| 1,6 hexanediol (UBE) | 279.93 gms |
| Terephthalic acid (Amoco) | 2048.14 gms |
| Butylchlorotin dihydroxide (Elf-Atochem) | 4.00 gms |
| Antioxidant (Weston 618-General Electric) | 8.00 gms |

The mixture was heated gradually to 205° C. and then processed at 240° C. to an acid value of 4 to 7 mg KOH/gram resin with an ICI cone and plate viscosity of 10–14 poise at 125° C. The hydroxyl number of this oligomer was found to be about 130–140 mg KOH/gram resin.

Stage 2
Preparation of hydroxyl Terminated Branched Oligoester

The above oligomer was cooled to 180° C. and 277.86 gms of trimellitic anhydride were added. The temperature was raised to 210–215° C. and vacuum was slowly applied over a 50 minute period until a vacuum of 23–24 inches of mercury was obtained. The reaction was monitored by regularly taking a sample and determining the acid number and ICI cone and plate viscosity @ 200° C. When an ICI cone and plate viscosity of 50–60 poise and an acid value of 4–10 mg KOH/gram resin were obtained, the melt was cooled down to 195° C. and discharged from the flask. The color of the resin was nearly colorless/transparent to light yellow in color.

EXAMPLE 3–6

Preparation of Powder Coatings

All oligoesters were made into a high gloss, white powder coating prepared as follows:

|  | Example 3 (g) | Example 4 (g) | Example 5 (g) | Example 6 (g) |
| --- | --- | --- | --- | --- |
| Oligioester resin of Example 1 | 792.83 | 1093.40 | 0.00 | 1059.80 |
| Oligioester resin of Example 2 | 0.00 | 0.00 | 812.45 | 0.00 |
| Triazole blocked polyisocyante (Alcure 4470 McWhorter Technologies) | 174.67 | 206.60 | 155.05 | 200.20 |
| Flow Agent (Modaflow 2000, Monsanto) | 0.00 | 24.00 | 0.00 | 24.00 |
| Flow Agent (Modaflow III, Monsanto) | 18.00 | 0.00 | 18.00 | 0.00 |
| Degassing agent (benzoin) | 12.00 | 16.00 | 12.00 | 16.00 |
| Titanium dioxide (R-960, DuPont) | 495.00 | 660.00 | 495.00 | 660.00 |
| Stannous Octoate catalyst, 70% active (ST-70, Estron Chemical) | 7.50 | 0.00 | 7.50 | 20.00 |
| Dibutyltin dilaurate 70% active (Butaflow BT-71, Estron Chemical) | 0.00 | 0.00 | 0.00 | 20.00 |

All the above ingredients were initially mixed in a high speed mill such as Welex mixer, where a homogeneous mix was obtained. The resulting mix was processed through a Buss PR-46 single screw extruder at 200 rpm having zone 1 at 92° C. and zone 2 at 140° C. The resulting melt was discharged onto a pair of water-cooled squeeze rolls, from which the emerging cooled sheet was roughly crushed prior to pulverizing in either a Brinkmann grinder or a coffee grinder and sieving through a 140 mesh screen.

The powder coatings were electrostatically sprayed onto ground steel panels (Type S-39, The Q-Panel Company). The physical properties of the formulated powder coatings were determined after the stated curing schedules and cured film thickness. The test results for these powder coatings are given in Table 1.

TABLE 1

Film Evaluation of Cured Powder Coatings from Examples 3, 4, 5 and 6

| Property Cure Schedule | Example 3 30 min at 150° C. | Example 4 45 min at 143° C. | Example 5 30 min at 150° C. | Example 6 30 min at 143° C. |
| --- | --- | --- | --- | --- |
| gel time at 204° C., mean of 2 (sec) | 83 | 83 | 84 | 35 |
| pill flow, 65° inclination, 15 min at 150° (mm) | 70 | 89 | 65 | 51 |
| direct impact, pass (in lb) | 320 | 320 | 320 | 320 |
| reverse impact, pass (in lb) | 320 | 176 | 320 | 320 |
| 20° gloss, mean of 6 readings | 70 | 59 | 60 | 53 |
| 60° gloss, mean of 6 readings | 92 | 88 | 88 | 88 |
| MEK resistance[1] | 3 | 5 | 1 | 3–4 |
| smoothness[2] | 3 | 3 | 2 | 2–3 |
| film thickness, mean of 6 readings (mil) | 2.1 | 1.7 | 1.9 | 1.8 |

Expanation of References in Table 1
Reference 1: Essentially the Powder Coating Institute Recommended Procedure #8
Ratings:
  1=no discernible loss in gloss
  2=just discernible loss in gloss from peaks in film
  3=slight loss in gloss from peaks in film
  4=loss of gloss over rub area, but many high gloss areas in troughs between peaks in film
  5=loss of gloss over rub area, but a few high gloss areas in troughs between peaks in film. No significant removal of coating.
Reference 2: Powder Coating Institute Powder Smoothness Standards. Standard panels for comparing smoothness, with 1=roughest and 10=smoothest.

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A powder coating composition comprising:
   a branched hydroxyl terminated oligoester polyol which has a hydroxyl value in the range of from about 15 to about 250, an acid number of about 1 to about 25, and a number average molecular weight in the range of from about 1000 to about 7500 daltons, wherein the branched hydroxyl terminated oligoester polyol is the reaction product of a hydroxyl terminated oligoester diol and a polyacid or anhydride having a carboxyl functionality of about 3 or greater; and
   a triazole blocked polyisocyanate cross-linking agent, the branched hydroxyl terminated oligoester polyol and cross-linking agent each being in relative amounts effective for curing the powder coating composition at a temperature as low as about 140° C. with the use of an effective amount of urethane catalyst and as low as about 145° C. without the use of an effective amount of urethane catalyst to provide a cured coating binder having a pencil hardness of at least about H, a direct impact resistance of at least about 80 in lb and a reverse impact resistance of at least about 80 in lbs at a cured film thickness of about 0.8 to about 2.5 mils, the coating composition having a Tg of about 40° C. or greater.

2. A powder coating composition as recited in claim 1, wherein the equivalent ratio of hydroxyl terminated oligoester diol to polyacid is from about 9:1 to about 30:1.

3. A powder coating composition as recited in claim 2, wherein the hydroxyl terminated oligoester diol is the reaction product of a diol reactant and a diacid reactant selected from the group consisting of an open chain aliphatic dicarboxylic acid, a cycloaliphatic dicarboxylic acid, an aromatic dicarboxylic acid, an open chain aliphatic dicarboxylic acid anhydride, a cycloaliphatic dicarboxylic acid anhydride, an aromatic dicarboxylic acid anhydride, an open chain dicarboxylic acid halide, a cycloaliphatic dicarboxylic acid halide, an aromatic dicarboxylic acid halide and mixtures thereof, the reaction of the diol reactant and the diacid reactant at a time and temperature effective for providing the hydroxyl terminated oligoester diol having a molecular weight in the range of from about 400 to about 1500 daltons.

4. A powder coating composition as recited in claim 3 wherein the diol reactant is selected from the group consisting of neopentyl glycol, 1,6 hexane diol, 2-butyl-2-ethyl-1,3-propane diol, 1,4 cyclohexanedimethanol, diethylene glycol, 1,3 propanediol, hydrogenated bisphenol A, dimethylol propionic acid, 2,3,4,4-tetramethyl-1,3-cyclobutanediol, ethylene glycol, propylene glycol, 2,4-dimethyl-2-ethylhexane-1,3-diol, 2-ethyl-2-isobutyl-1,3-propanediol, 1,3-butanediol, 1,4-butanediol, 1,5-pentanediol, thiodiethanol, 1,2-cyclohexanedimethanol, 1,3-cyclohexanedimethanol, 1,4-xylylenediol, ethoxylated bisphenol A, methyl propanediol, 2-methyl-1,3-propane diol, hydroxypivalyl hydroxypivalate, vinyl cyclohexanediol, dipropylene glycol, dimethylol propionic acid, aromatic diol compounds and mixtures thereof.

5. A powder coating composition as recited in claim 4, wherein the diacid reactant is an aromatic diacid reactant and the aromatic diacid reactant is an aromatic acid, acid anhydride or acid halide of terephthalic acid, phthalic acid, phthalic anhydride, dimethyl terephthalic acid, naphthalene dicarboxylate, tetrachlorophthalic acid, terephthalic acid bisglycol ester, isophthalic acid, t-butyl isophthalic acid, or mixtures thereof.

6. A powder coating composition as recited in claim 5, wherein the diol reactant is selected from the group consisting of neopentyl glycol, 1,6 hexane diol, 2-butyl-2-ethyl-1,3-propane diol, 1,4 cyclohexanedimethanol, and mixtures thereof.

7. A powder coating composition as recited in claim 6, wherein the diacid reactant is an aromatic acid, anhydride or acid halide of an aromatic acid is selected from the group consisting of terephthalic acid, isophthalic acid, t-butyl isophthalic acid, and mixtures thereof.

8. A powder coating composition as recited in claim 4, wherein the diacid reactant includes an open chain aliphatic diacid reactant where the open chain aliphatic diacid reactant is the open chain aliphatic acid, acid anhydride or acid halide of fumaric acid, adipic acid, azelaic acid, sebacic acid, dodecanoic acid, glutaric acid, succinic acid, oxalic acid, itaconic acid, dimer fatty acids, maleic acid, chlorendic acid, diglycolic acid, nadic acid, or mixtures thereof.

9. A powder coating composition as recited in claim 4, wherein the diacid reactant includes a cycloaliphatic diacid reactant where the cycloaliphatic diacid reactant is the cycloaliphatic acid, the cycloaliphatic anhydride or cycloaliphatic acid halide of 1,4-cyclohexane dicarboxylic acid, 1,3-cyclohexane dicarboxylic acid, hexahydrophthalic acid, dimethyl cyclohexane dicarboxylic acid or mixtures thereof.

10. A powder coating composition as recited in claims 1, 2, 5, 6 or 7 wherein the polyacid is a triacid.

11. A powder coating composition as recited in claim 10, wherein the triacid is selected from the group consisting of trimellitic anhydride, citric acid, and mixtures thereof.

12. A powder coating composition as recited in claim 11, wherein the triacid is trimellitic anhydride.

13. A powder coating composition as recited in claim 1 wherein the triazole blocked polyisocyanate is the reaction product of a triazole selected from the group consisting of 1H-1,2,4-triazole, 1H-1,2,3-triazole, 1H-1,2,4-triazole-3-thiol and 1H-1,2,3-triazolo[4,5-]pyridine, and mixtures thereof, and an isocyanate compound.

14. A powder coating composition as recited in claim 13, wherein the trizaole blocked polyisocyanate has the general formula

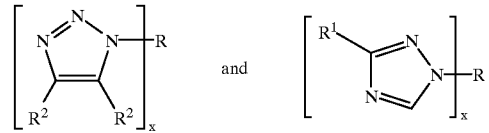

where R is an isocyanate compound, $R^1$ is H or thiol, $R^2$ is H or pyridine, and x is 2 to 4.

15. A powder coating composition as recited in claim 1, wherein the oligoester ester diol is the reaction product of a lactone selected from the group consisting of β-propiolactone, γ-butyrolactone, γ- and delta-valerolactone, ε-caprolactone, 3,5,5,- and 3,3,5-trimethylcaprolactone and mixtures thereof, and a dihydric compound.

16. A powder coating composition as recited in claim 1, wherein the branched hydroxyl terminated oligoester polyol has a hydroxyl functionality of about 1.5 to about 5.0.

17. A powder coating composition as recited in claims 1 or 2, wherein the powder coating composition has about 18 to about 97 weight percent branched hydroxyl terminated oligoester polyol, based on the weight of the branched hydroxyl terminated oligoester polyol and crosslinking agent.

18. A powder coating composition as recited in claims 1 or 2, wherein the powder coating composition has about 3 to about 82 weight percent triazole blocked polyisocyanate cross-linking agent, based on the weight of the branched hydroxyl terminated oligoester polyol and cross-linking agent.

19. A powder coating composition as recited in claim 1, wherein the hydroxyl terminated oligoester diol is the reaction product of 3-hydroxy-2,2-dimethylproprionate and a diacid reactant selected from the group consisting of an open chain aliphatic dicarboxylic acid, a cycloaliphatic dicarboxylic acid, an aromatic dicarboxylic acid, an open chain aliphatic dicarboxylic acid anhydride, a cycloaliphatic dicarboxylic acid anhydride, an aromatic dicarboxylic acid anhydride, an open chain dicarboxylic acid halide, a cycloaliphatic dicarboxylic acid halide, an aromatic dicarboxylic acid halide and mixtures thereof.

20. A powder coating composition as recited in claim 19, wherein the diacid reactant is an aromatic diacid reactant and the aromatic diacid reactant is an aromatic acid, acid anhydride or acid halide of terephthalic acid, phthalic acid, phthalic anhydride, dimethyl terephthalic acid, naphthalene dicarboxylate, tetrachlorophthalic acid, terephthalic acid bisglycol ester, isophthalic acid, t-butyl isophthalic acid, or mixtures thereof.

21. A process for preparing a powder coating composition which when applied to a substrate is effective for providing a coating having a Tg of about 40° C. or greater, a pencil hardness of at least about H, a direct impact resistance of at least about 80 in lbs and a reverse impact resistance of at least about 80 in lbs at a film thickness of about 0.8 to about 2.5 mils, the process comprising:
  blending a branched hydroxyl terminated oligoester polyol with a triazole blocked isocyanate crosslinking agent to provide the powdered coating composition, wherein the branched hydroxyl terminated oligoester polyol has a hydroxyl value in the range of from about 15 to about 250, an acid number of about 1 to about 25, and a number average molecular weight in the range of from about 1000 to about 7500 daltons, and wherein the branched hydroxyl terminated oligoester polyol is the reaction product of a hydroxyl terminated oligoester diol and a polyacid/anhydride having a carboxyl functionality of about 3 or greater;
  wherein the triazole blocked isocyanate cross-linking agent is effective for providing an equivalent ratio of isocyanate groups to hydroxyl groups of from about 0.5:1.0 to about 1.8:1.0 and the triazole blocked polyisocyanate cross-linking agent is present in an amount effective for curing the powder coating composition at temperatures as low as about 140° C. with the use of an effective amount of urethane catalyst and as low as about 145° C. without the use of an effective amount of urethane catalyst.

22. A process for preparing a powder coating composition as recited in claim 21, wherein the equivalent ratio of hydroxyl terminated oligoester diol to polyacid is from about 9:1 to about 30:1.

23. A process for preparing a powder coating composition as recited in claim 22, wherein the hydroxyl terminated oligoester diol is the reaction product of a diol reactant and a diacid reactant selected from the group consisting of an open chain aliphatic dicarboxylic acid, a cycloaliphatic dicarboxylic acid, an aromatic dicarboxylic acid, an open chain aliphatic dicarboxylic acid anhydride, a cycloaliphatic dicarboxylic acid anhydride, an aromatic dicarboxylic acid anhydride, an open chain dicarboxylic acid halide, a cycloaliphatic dicarboxylic acid halide, an aromatic dicarboxylic acid halide and mixtures thereof, the reaction of the diol reactant and the diacid reactant at a time and temperature effective for providing the hydroxyl terminated oligoester diol having a molecular weight in the range of from about 400 to about 1500 daltons.

24. A process for preparing a powder coating composition as recited in claim 23, wherein the diacid reactant is an aromatic diacid reactant and the aromatic diacid reactant is the aromatic acid, acid anhydride or acid halide of terephthalic acid, phthalic acid, phthalic anhydride, dimethyl terephthalic acid, naphthalene dicarboxylate, tetrachlorophthalic acid, terephthalic acid bisglycol ester, isophthalic acid, t-butyl isophthalic acid, or mixtures thereof.

25. A process for preparing a powder coating composition as recited in claim 23, wherein the diacid reactant includes a cycloaliphatic diacid reactant where the cycloaliphatic diacid reactant is the cycloaliphatic acid, the cycloaliphatic anhydride or cycloaliphatic acid halide of 1,4-cyclohexane dicaboxylic acid, 1,3-cyclohexane dicarboxylic acid, hexahydrophthalic acid, dimethyl cyclohexane dicarboxylic acid or mixtures thereof.

26. A process for preparing a powder coating composition as recited in claim 23, wherein the diol reactant is selected from the group consisting of neopentyl glycol, 1,6 hexane diol, 2-butyl-2-ethyl-1,3-propane diol, 1,4 cyclohexanedimethanol, and mixtures thereof, the diacid reactant is selected from the group consisting of an aromatic diacid reactant, a cycloaliphatic diacid reactant and mixtures thereof and where the aromatic diacid reactant is the aromatic acid, acid anhydride or acid halide of terephthalic acid, phthalic acid, phthalic anhydride, dimethyl terephthalic acid, naphthalene dicarboxylate, tetrachlorophthalic acid, terephthalic acid bisglycol ester, isophthalic acid, t-butyl isophthalic acid, and mixtures thereof and where the cycloaliphatic reactant is the cycloaliphatic acid, the cycloaliphatic anhydride or cycloaliphatic acid halide of 1,4-cyclohexane dicaboxylic acid, 1,3-cyclohexane dicarboxylic acid, hexahydrophthalic acid, dimethyl cyclohexane dicarboxylic acid and mixtures thereof.

27. A process for preparing a powder coating composition as recited in claim 26, wherein the polyacid is a triacid.

28. A process for preparing a powder coating composition as recited in claim 27, wherein the branched hydroxyl terminated oligoester polyol has a hydroxyl functionality of about 1.5 to about 5.0.

29. A process for preparing a powder coating composition as recited in claim 27 wherein the reaction that forms the hydroxyl terminated oligoester diol is cooled to about 170° C. to about 200° C. to provide the oligoester diol with the molecular weight of from about 400 to about 1500 daltons.

30. A process for preparing a powdered coating composition as recited in claims 21 or 22, wherein the powder coating composition has about 18 to about 97 weight percent branched hydroxyl terminated oligoester polyol, based on the weight of the branched hydroxyl terminated oligoester polyol and cross-linking agent.

31. A process for preparing a powdered coating composition as recited in claims 21 or 22, wherein the powder coating composition has about 3 to about 82 weight percent triazole blocked cross-linking agent, based on the weight of the branched hydroxyl terminated oligoester polyol and cross-linking agent.

32. A process for preparing a powdered coating composition as recited in claim 21 wherein the triazole blocked polyisocyanate is the reaction product of a triazole selected from the group consisting of 1H-1,2,4-triazole, 1H-1,2,3-triazole, 1H-1,2,4-triazole-3-thiol and 1H-1,2,3-triazolo[4,5-b]pyridine, and mixtures thereof, and an isocyanate.

33. A powder coating composition comprising:
  a branched hydroxyl terminated oligoester polyol which has a hydroxyl value in the range of from about 15 to about 250, an acid number of about 1 to about 25, and a number average molecular weight in the range of from about 1000 to about 7500 daltons, wherein the branched hydroxyl terminated oligoester polyol is the reaction product of a hydroxyl terminated oligoester diol and a polyacid or anhydride having a carboxyl functionality of about 3 or greater; and
  a triazole blocked polyisocyanate cross-linking agent, the branched hydroxyl terminated oligoester polyol and cross-linking agent each being in relative amounts effective for curing the powder coating composition at a temperature as low as about 140° C. with the use of an effective amount of urethane catalyst and as low as about 145° C. without the use of an effective amount of urethane catalyst to provide a cured coating binder having a pencil hardness of at least about H, a direct impact resistance of at least about 80 in lb and a reverse impact resistance of at least about 80 in lbs at a cured film thickness of about 0.8 to about 2.5 mils, the coating composition having a Tg of about 40° C. or greater,
  wherein the triazole blocked polyisocyanate is the reaction product of a triazole selected from the group consisting of 1H-1,2,4-triazole, 1H-1,2,3-triazole, 1H-1,2,4-triazole- 3-thiol and 1H-1,2,3-triazolo[4,5-b] pyridine, and mixtures thereof, and an isocyanate compound.

34. A powder coating composition as recited in claim 33, wherein the equivalent ratio of hydroxyl terminated oligoester diol to polyacid is from about 9:1 to about 30:1.

35. A powder coating composition as recited in claim 34, wherein the hydroxyl terminated oligoester diol reactant is the reaction product of a diol and a diacid reactant selected from the group consisting of an open chain aliphatic dicarboxylic acid, a cycloaliphatic dicarboxylic acid, an aromatic dicarboxylic acid, an open chain aliphatic dicarboxylic acid anhydride, a cycloaliphatic dicarboxylic acid anhydride, an aromatic dicarboxylic acid anhydride, an open chain dicarboxylic acid halide, a cycloaliphatic dicarboxylic acid halide, an aromatic dicarboxylic acid halide and mixtures thereof, the reaction of the diol reactant and the diacid reactant at a time and temperature effective for providing the hydroxyl terminated oligoester diol having a molecular weight in the range of from about 400 to about 1500 daltons.

36. A powder coating composition as recited in claim 35, wherein the diacid reactant is an aromatic diacid reactant and the aromatic diacid reactant is an aromatic acid, acid anhydride or acid halide of terephthalic acid, phthalic acid, phthalic anhydride, dimethyl terephthalic acid, naphthalene dicarboxylate, tetrachlorophthalic acid, terephthalic acid bisglycol ester, isophthalic acid, t-butyl isophthalic acid, or mixtures thereof.

37. A powder coating composition as recited in claim 36, wherein the diacid reactant is an aromatic acid, anhydride or acid halide of an aromatic acid is selected from the group consisting of terephthalic acid, isophthalic acid, t-butyl isophthalic acid, and mixtures thereof.

38. A powder coating composition as recited in claim 35, wherein the diacid reactant includes an open chain aliphatic diacid reactant where the open chain aliphatic diacid reactant is the open chain aliphatic acid, acid anhydride or acid halide of fumaric acid, adipic acid, azelaic acid, sebacic acid, dodecanoic acid, glutaric acid, succinic acid, oxalic acid, itaconic acid, dimer fatty acids, maleic acid, chlorendic acid, diglycolic acid, nadic acid, or mixtures thereof.

39. A powder coating composition as recited in claim 35, wherein the diacid reactant includes a cycloaliphatic diacid reactant where the cycloaliphatic diacid reactant is the cycloaliphatic acid, the cycloaliphatic anhydride or cycloaliphatic acid halide of 1,4-cyclohexane dicaboxylic acid, 1,3-cyclohexane dicarboxylic acid, hexahydrophthalic acid, dimethyl cyclohexane dicarboxylic acid and mixtures thereof.

40. A powder coating composition as recited in claim 34 wherein the diol reactant is selected from the group consisting of neopentyl glycol, 1,6 hexane diol, 2-butyl-2-ethyl-1,3-propane diol, 1,4 cyclohexanedimethanol, diethylene glycol, 1,3 propanediol, hydrogenated bisphenol A, dimethylol proprionic acid, 2,3,4,4-tetramethyl-1,3-cyclobutanediol, ethylene glycol, propylene glycol, 2,4-dimethyl-2-ethylhexane-1,3-diol, 2-ethyl-2-isobutyl-1,3-propanediol, 1,3-butanediol, 1,4-butanediol, 1,5-pentanediol, thiodiethanol, 1,2-cyclohexanedimethanol, 1,3-cyclohexanedimethanol, 1,4-xylylenediol, ethoxylated bisphenol A, methyl propanediol, 2-methyl-1,3-propane diol, hydroxypivalyl hydroxypivalate, vinyl cyclohexanediol, dipropylene glycol, dimethylol propionic acid, aromatic diol compounds and mixtures thereof.

41. A powder coating composition as recited in claim 40, wherein the diol reactant is selected from the group consisting of neopentyl glycol, 1,6 hexane diol, 2-butyl-2-ethyl-1,3-propane diol, 1,4 cyclohexanedimethanol, and mixtures thereof.

42. A powder coating composition as recited in claim 34, wherein the triacid is selected from the group consisting of trimellitic anhydride, citric acid, and mixtures thereof.

43. A powder coating composition as recited in claim 42, wherein the triacid is trimellitic anhydride.

44. A powder coating composition as recited in claims 33 or 34 wherein the polyacid is a triacid.

45. A powder coating composition as recited in claim 33, wherein the oligoester ester diol is the reaction product of a lactone selected from the group consisting of β-propiolactone, γ-butyrolactone, γ- and delta-valerolactone, ε-caprolactone, 3,5,5,- and 3,3,5-trimethylcaprolactone and mixtures thereof, and a dihydric compound.

46. A powder coating composition as recited in claim 33, wherein the branched hydroxyl terminated oligoester polyol has a hydroxyl functionality of about 1.5 to about 5.0.

47. A powder coating composition as recited in claim 33 wherein the trizaole blocked polyisocyanate has the general formula

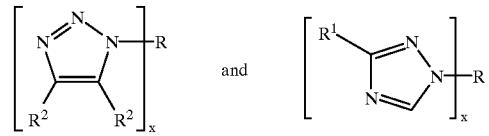

where R is an isocyanate compound, $R^1$ is H or thiol, $R^2$ is H or pyridine, and x is 2 to 4.

48. A powder coating composition as recited in claim 33, wherein the hydroxyl terminated oligoester diol is the reaction product of 3-hydroxy-2,2-dimethylproprionate and a diacid reactant selected from the group consisting of an open chain aliphatic dicarboxylic acid, a cycloaliphatic dicarboxylic acid, an aromatic dicarboxylic acid, an open chain aliphatic dicarboxylic acid anhydride, a cycloaliphatic dicarboxylic acid anhydride, an aromatic dicarboxylic acid anhydride, an open chain dicarboxylic acid halide, a cycloaliphatic dicarboxylic acid halide, an aromatic dicarboxylic acid halide and mixtures thereof.

49. A powder coating composition as recited in claim 48, wherein the diacid reactant is an aromatic diacid reactant and the aromatic diacid reactant is an aromatic acid, acid anhydride or acid halide of terephthalic acid, phthalic acid, phthalic anhydride, dimethyl terephthalic acid, naphthalene dicarboxylate, tetrachlorophthalic acid, terephthalic acid bisglycol ester, isophthalic acid, t-butyl isophthalic acid, or mixtures thereof.

50. A powder coating composition comprising:
  a branched hydroxyl terminated oligoester polyol which has a hydroxyl value in the range of from about 15 to about 250, an acid number of about 1 to about 25, and a number average molecular weight in the range of from about 1000 to about 7500 daltons, wherein the branched hydroxyl terminated oligoester polyol is the reaction product of a hydroxyl terminated oligoester diol and a polyacid or anhydride having a carboxyl functionality of about 3 or greater; and a triazole blocked isophorone diisocyanate, the branched hydroxyl terminated oligoester polyol and triazole blocked isophorone diisocyanate each being in relative amounts effective for curing the powder coating composition at a temperature as low as about 140° C. with the use of an effective amount of urethane catalyst and as low as about 145° C. without the use of an effective amount of urethane catalyst to provide a cured coating binder having a pencil hardness of at least about H, a direct impact resistance of at least about 80 in lb and a reverse impact resistance of at least about 80 in lbs at a cured film thickness of about 0.8 to about 2.5 mils, the coating composition having a Tg of about 40° C. or greater.

51. A powder coating composition as recited in claim 50, wherein the branched hydroxyl terminated oligoester polyol has an acid number of about 5 to about 7.

* * * * *